No. 745,751. PATENTED DEC. 1, 1903.
C. A. ABBATH.
FISH HOOK ATTACHING DEVICE.
APPLICATION FILED AUG. 15, 1903.
NO MODEL
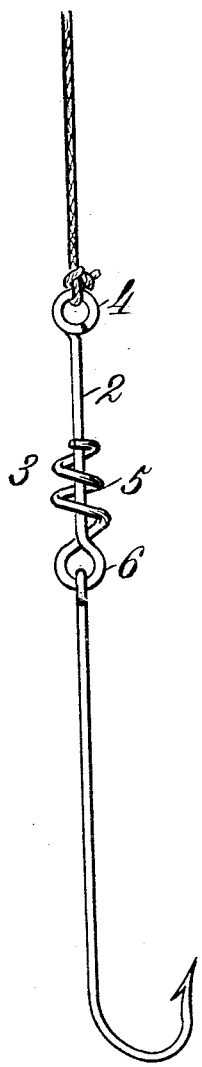
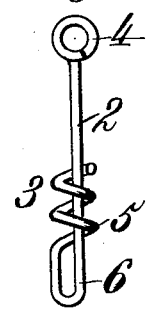
Witnesses:
Robert Everett.
Dennis Sumby.
Inventor:
Charles A. Abbath,
By James L. Norris
Att'y.

No. 745,751.                                                           Patented December 1, 1903.

UNITED STATES PATENT OFFICE.

CHARLES A. ABBATH, OF QUINCY, ILLINOIS.

FISH-HOOK-ATTACHING DEVICE.

SPECIFICATION forming part of Letters Patent No. 745,751, dated December 1, 1903.

Application filed August 15, 1903. Serial No. 169,638. (No model.)

*To all whom it may concern:*

Be it known that I, CHARLES A. ABBATH, a citizen of the United States, residing at Quincy, in the county of Adams and State of Illinois, have invented new and useful Improvements in Fish-Hook-Attaching Devices, of which the following is a specification.

This invention relates to what I shall for convenience term a "fish-hook-attaching device," the object of the invention being to provide a simple, light, and inexpensive article of this character which can be readily connected with fishing-lines of various kinds and to which hooks can be easily and quickly united and removed with equal facility.

In fishing it is desirable to change hooks a number of times a day from one size to another to meet different conditions, and to untie a hook from an ordinary line and apply a different one thereto are operations that necessitate the outlay of time. With small hooks, which necessarily have small eyes, certain sizes of fishing-lines will not pass through such small eyes, so that to attach these small hooks to the lines the latter must be divided or split, which weakens the same. By virtue of my invention I overcome these obstacles.

In the drawings accompanying and forming part of this specification I have illustrated two simple adaptations of the invention which I will describe at length in the following description, the novelty of the invention constituting the basis of the claim succeeding such description.

Referring to the drawings, Figure 1 is an elevation of one form of the device. Figs. 2 and 3 are cross-sections taken at different points in the length of the article. Fig. 4 is a view corresponding to Fig. 1 and showing the other form of the invention.

Like characters refer to like parts throughout the several figures.

Referring more especially to Figs. 1, 2, and 3, the device therein shown consists of a wire body bent upon itself at what is shown as its lower end to form the branches 2 and 3, the branch 2 constituting the main one, while the branch 3 constitutes the auxiliary one. As the branch 2 is connected directly with the fishing-line, I have given it the designation "main branch." The latter has at its upper end an eye 4 to receive a fishing-line, which may be connected thereto in any convenient way. The eye 4 is doubled to prevent the detachment of the line therefrom.

As previously indicated, the device is made from wire, and to prevent the same from rusting it is preferably of brass. The branches 2 and 3 are separated adjacent the bend to form a hook-receiving loop 6, the auxiliary branch being coiled around the main one, as shown at 5. The coil 5 is not in contact with the main branch or shank of the device; but the terminal helices of the coil are closer to said main branch than the remainder of the coil structure in order to prevent the accidental detachment or upward slipping of the hook.

The only difference between the two forms of the device illustrated, respectively, in Figs. 1 2 and 3 and 4 is in the shape of the hook-receiving loop. The loop in the case of the first form is approximately of circular shape, while in the other form it is of substantially oblong shape.

To apply a hook to the attaching device, the end of the upper terminal helix or whirl of the coil 5 is introduced into the eye at the upper end of the fish-hook, and the device is then rotated so as to carry the eye of the hook along the lower coils and onto the loop 6, or the same result can be attained by holding the device stationary and moving the eye of the fish-hook along the helices of the coil until the eye reaches the loop.

To remove the fish-hook, either of the foregoing operations will be reversed. As the terminal helices or whirls of the coil 5 are closer to the main branch or shank 2 of the device than the intermediate portions, catches are thereby presented to prevent the accidental slipping of the hook from place. When the hook is manually applied to the device, the eye upon the application of a slight pressure to the hook will readily snap by these catch portions.

The removal of a hook from the device and the application of another one instead thereof are operations that will require but a very short time, and the hook when in place is effectually prevented from accidental detachment.

The coil 5 may have any desirable number of helices, and its length may be varied within certain limits. The device is usually made in several sizes to receive hooks from the smallest to the largest size.

The hooks are not connected directly to the line, but to the attaching device carried thereby, so that by means of my invention in case a fish should swallow a hook he cannot bite the line in half, an accident that is common where the hooks are directly united to lines in the customary way.

Having thus described my invention, what I claim as new, and desire to secure by Letters Patent, is—

In a fish-hook-attaching device, a wire body bent upon itself to present main and auxiliary branches, the branches being separated from each other adjacent the bend to form a loop, and the auxiliary branch having a coil surrounding the main branch, the terminal portions of the coil being closer to the main branch than the other ones.

In testimony whereof I have hereunto set my hand in presence of two subscribing witnesses.

CHARLES A. ABBATH.

Witnesses:
WILLIAM H. GOVERT,
ALBERT DICK.